United States Patent [19]

Panarello et al.

[11] 4,312,659
[45] Jan. 26, 1982

[54] AIR SUPPORT SYSTEM FOR GLASS TUBING ALLEY

[75] Inventors: Salvatore C. Panarello, Hammonton; Edward G. Schmitzler, Vineland, both of N.J.

[73] Assignee: Owens-Illinois, Inc., Toledo, Ohio

[21] Appl. No.: 166,528

[22] Filed: Jul. 7, 1980

Related U.S. Application Data

[63] Continuation-in-part of Ser. No. 68,379, Aug. 21, 1979, abandoned.

[51] Int. Cl.³ .............................................. C03B 15/18
[52] U.S. Cl. .............................................. 65/84; 65/86; 65/25.1; 65/182.2
[58] Field of Search ............... 65/25.1, 84, 86, 182.2, 65/187

[56] References Cited

U.S. PATENT DOCUMENTS

| | | | |
|---|---|---|---|
| 1,638,593 | 8/1927 | Mulholland | 65/25.1 |
| 1,949,037 | 2/1934 | Cardot | 65/187 X |
| 2,790,994 | 5/1957 | Cardot et al. | 65/187 X |
| 2,805,898 | 9/1957 | Willis, Jr. | 65/182.2 X |
| 3,169,272 | 2/1965 | Maxson | 264/209 |
| 3,190,739 | 6/1965 | Wilson | 65/86 X |
| 3,278,286 | 10/1966 | Nitsche et al. | 65/187 X |
| 3,296,661 | 1/1967 | Moustier | 264/177 R |
| 3,473,907 | 10/1969 | Wilson | 65/187 X |
| 3,554,723 | 1/1971 | Wilson | 65/86 |
| 3,884,668 | 5/1975 | Suzuki et al. | 65/187 X |

FOREIGN PATENT DOCUMENTS

| | | | |
|---|---|---|---|
| 574354 | 2/1946 | United Kingdom | 65/182.2 |
| 1025500 | 4/1966 | United Kingdom | 65/25.1 |
| 1102360 | 2/1968 | United Kingdom | 65/187 |

Primary Examiner—Arthur D. Kellogg
Attorney, Agent, or Firm—Richard D. Heberling; Myron E. Click; David H. Wilson

[57] ABSTRACT

The invention provides method and apparatus for supporting hot glass tubing drawn from a source of molten glass, on a cushion of air. A horizontally elongated chamber is disposed beneath the drawpath of the tubing and an elevated air pressure is maintained in the chamber. The top wall of the chamber defines a V notch in vertical cross section within which the tubing is disposed and one or more openings or slots traversing the vertex portion of the top wall provide an upward flow of air from the chamber to support the tubing being drawn. The dimensions of the openings are selected as a function of the range of diameter and weight of the glass tubing to be supported and the air pressure is selected as a function of the same variables. Air flow cooling of the top portions of the tubing may be provided to reduce bow.

22 Claims, 10 Drawing Figures

AIR SUPPORT SYSTEM FOR GLASS TUBING ALLEY

RELATIONSHIP TO OTHER APPLICATIONS

This application constitutes a continuation-in-part of our prior application, Ser. No. 068,379 filed Aug. 21, 1979, now abandoned.

BACKGROUND OF THE INVENTION

Glass tubing has been drawn from a source of molten glass by a number of different methods, but small diameter tubing in the range of five to sixty-five millimeters OD has normally been drawn by pulling the tubing along an elongated horizontal path defined by a plurality of supporting rollers. Even though such rollers are fabricated from graphite, it is a well known fact that some deformation or marking of the surface occurs as the hot tubing is pulled horizontally over the rollers, particularly when such tubing is still plastic. This deformation increased in proportion to the production rate, since increased production results in higher forming temperatures, making the tubing more susceptible to deformation. This relationship resulted in limited production capabilities for any given alley as determined by specifications for acceptable levels of tubing deformation.

In British Pat. No. 1,025,500 issued to Corning Glass Works, there is disclosed an apparatus for supporting drawn tubing on a cushion of air. The air cushion is provided by upward air flow through a generally U-shaped porous baffle formed of sintered metal which has a diameter slightly larger than the outer diameter of the glass tubing to be supported by an amount sufficient to create an air cushion between the lower surface of the tubing and the semi-cylindrical air supplying baffle. The obvious disadvantage of this construction is the fact that it is effective for only one diameter of tubing. Those skilled in the art will recognize that any modern tubing alley has to be capable of producing a rather wide range of diameters and weights of tubing in order to supply the market needs. Since the length of the plastic range of hot glass tubing alleys can vary from twenty to fifty feet, it is obviously impractical to substitute a proper diameter porous air baffle member in the apparatus shown in the British patent each time that a change in tubing diameter is desired. For efficient operation, the downtime associated with a job change on a tubing alley must be minimized, so mechanical changes to the tube support mechanism cannot be tolerated.

SUMMARY OF THE INVENTION

It is, accordingly, an object of the invention to provide an improved apparatus for supporting drawn hot glass tubing on a cushion of air which will be effective over a relatively wide range of tubing diameter and linear weight.

This invention contemplates providing a horizontally elongated air chamber disposed beneath the drawing path of the tubing. The top wall of such air chamber is formed of graphite and defines a V-shaped notch having a subtended angle on the order of one hundred degrees. Slot-like apertures are provided in a longitudinally array along the length of the V-shaped top panel, with such slots traversing the vertex portion of the panel. The dimensions of the slots are selected to provide an air flow effective for each of a relatively wide range of tubing diameters and weights which is drawn through the notch and supported by the upward passage of air through the slots. The air pressure above ambient within the air chamber is carefully controlled and is selected as a function of the tubing diameter and linear weight.

To minimize the creation of bow in the tubing by the air support, several modifications are proposed for producing a cooling air stream for the top portions of the tubing.

Other objects and advantages of this invention will be apparent to those skilled in the art from the following detailed description, taken in conjunction with the annexed sheets of drawings on which is shown a preferred embodiment of the invention.

DESCRIPTION OF THE PREFERRED EMBODIMENT

As is well known in the art, a tube drawing alley comprises an elongated structure, having a total length on the order of two hundred feet and having a height on the order of two feet. The one end of the alley is positioned adjacent to the glass furnace, which furnishes a continuous supply of molten glass to a tube forming mandrel or a tube drawing orifice to form the hot glass in a tubular configuration which is then drawn from the mandrel or orifice in a catenary path to assume a horizontal position and extend down the tube alley for sufficient distance for the drawn plastic tubing to become cold enough to permit it to be contacted by conventional apparatus, for example, drawing belts and a cut-off saw. It necessarily follows that a wide variety of structural members should be employed to define the tubing support mechanism and, while a specific structural arrangement is disclosed in the drawings, it should be understood that the essential elements of the tube alley 1 shown in the drawings comprise a primary air plenum 10, above which is supported a pressure control chamber 20, the top wall 21 of which defines a continuous row of orifices 30 for emitting sufficient air to support the hot tubing T in a position out of contact with the top wall 21.

Thus the primary air pressure chamber 10 is defined by the bolted or welded assembly of four channel-shaped frame elements 11a, 11b, 11c, and 11d. Elements 11a and 11b comprise the side walls of the chamber 10 while elements 11c and 11d comprise the bottom and top walls respectively of the chamber 10. Top channel member 11d is provided with an elongated slot 11e to permit the insertion therein of a depending sheet metal structure 22 forming part of a pressure control chamber 20.

The pressure control chamber is conveniently formed by a plurality of identical units assembled in longitudinally abutting relationship.

The upper portion of each pressure control chamber unit 20 is defined by a pair of laterally spaced upstanding side wall members 23a and 23b, each of which has horizontal flanges 23c and 23d, respectively, at their bottom ends for bolted securement to longitudinally extending bars 24 which respectively rest on the top wall 11d adjacent the lateral edges of the recess 11e. Integral horizontal flanges 22a formed on the top of depending sheet metal member 22 are also secured by the same bolts to the bars 24.

The upstanding wall members 23a and 23b are respectively provided with upwardly and outwardly inclined flanges 23e and 23f on their top portions and the top wall 21 is secured to such flanges by appropriate bolts 21a. Mounting plate 23g and 23h may be provided between top wall 21 and flanges 23e and 23f. More specifically, top wall 21 comprises a V-shaped element formed of carbon, graphite or other material which is known to produce a minimum of markings on hot glass which may inadvertently contact such top wall. To facilitate the manufacture of the top wall 21, it may be conveniently formed in two identical sections 21b and 21c which are disposed in abutting relationship at the vertex of the subtended angle defined by the top wall 21. The orifices 30 are then defined by aligned grooves 21e in the abutting surfaces of sections 21b and 21 c through which sufficient air is issued to support the hot glass tubing T until the tubing has cooled to a temperature where it may be supported by conventional graphite rollers without danger of deformation or marking of the tubing. The specific dimensions of the orifices 30 defined by the slots 21e in relationship to tubing diameter and weight will be discussed in detail hereinafter.

The subtended angle defined by the top surface of top wall 21 may vary in size from eighty-five to a hundred and twenty degrees, hence for the purpose of this application will be said to be on the order of a hundred degrees. A subtended angle of this magnitude has been found to provide satisfactory results for air support of hot glass tubing T ranging in diameter from five millimeters to sixty millimeters, including a wide variation in wall thickness, hence, in linear weight of the supported tubing.

Each chamber unit 20 is provided with sheet metal end plates 25d so that the pressure within each chamber unit 20 may be separately controlled.

A conventional air pump 5 is connected to the one end of the primary plenum chamber 10 to maintain an air pressure in such chamber of at least two inches of water column above ambient. Obviously, the exact pressure within the primary plenum chamber 10 will vary along the length of the tubing alley 1 because of temperature factors and the difference in spacing of a particular portion of the chamber relative to the discharge of the pump.

The air support system embodying this invention requires a carefully controlled above atmospheric pressure to be maintained in the pressure control chamber units 20. This controlled pressure is obtained by providing a plurality of selected area openings, preferably valved apertures 25, along the length of the bottom portion 22 of each control pressure chamber 20. Each aperture 25 is provided with an adjustable valve element 26 having a tapered head 26a which is axially movable relative to the orifice 25 to adjust the effective flow through the particular orifice.

Valve head 26 is rigidly mounted on the end of a bolt 27 which is slidably mounted in an actuating plate 28. A spring 28a operating between valve head 26a and plate 28 maintains the valve head in a projecting position relative to the actuating plate 28. Each plate 28 carries two valve elements 26.

Actuating plate 28 is mounted for reciprocating transverse movement relative to the apertures 25 on a pair of bolts 29 which are threaded into reinforcing plates 22c provided on each side of the lower end of the sheet metal wall portions 22. Springs 29a sorround each bolt 29 and urged the actuating plate 28 laterally in a direction away from the respective orifices 25.

The actuating plate 28 is laterally adjustable in small increments by an adjusting mechanism comprising a threaded shaft 31 rigidly secured to a medial portion of actuating plate 28 and extending laterally through the side wall 11b of the tubing alley. A U-shaped cross section shaft support bracket 32 is secured to the side wall 22b and provides bearing support for the shaft 31 in each of its arms 32a and 32b, the arm 32b having a slotted aperture (not shown). Intermediate the arms 32a and 32b an annular extension 33 of an adjusting knob 34 is inserted having internal threads (not shown) cooperating with the externally threaded end portion 31a of the shaft 31, so that rotational movements of the knob 34 effect an axial displacement of the adjusting shaft 31 and equivalent lateral displacement of the actuating plate 28 and the valve heads 26 relative to the apertures 25.

The exact air pressure existing within each of the pressure control chamber units 20 is detected by a tube 50 which extends upwardly into each chamber and the detected pressure is brought to the outside of the tubing alley 1 by a flexible hose 51 and a fitting 52. Fitting 52, is in turn connected to a pressure indicating meter 53, shown only in FIGS. 1 and 2, and the pressure existing in the pressure control chamber 20 at that point of the tubing alley may then be read on meter 53 and adjustments made by operating the respective adjusting knob 34 to vary the position of the valve heads 26a relative to the apertures 25 to maintain the desired pressure within each of the pressure control chambers 20. To make the pressure in the chamber 20 more uniform, it has been found desirable to impose an arcuate-shaped perforated baffle 7 between the lower portions of the chamber 20 and the upper portions.

Figure 1:
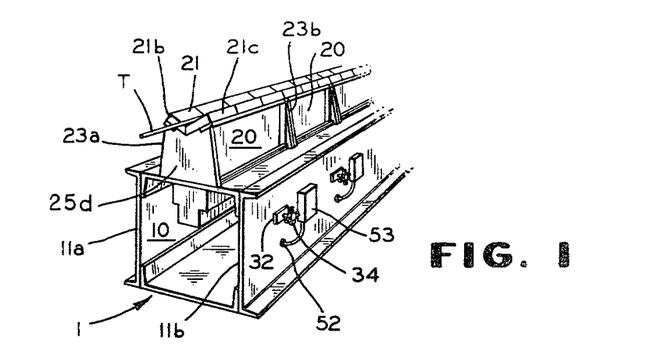
FIG. 1 is a miniaturized perspective view of a portion of a tube drawing alley incorporating an air support apparatus in accordance with this invention.
Figure 2:
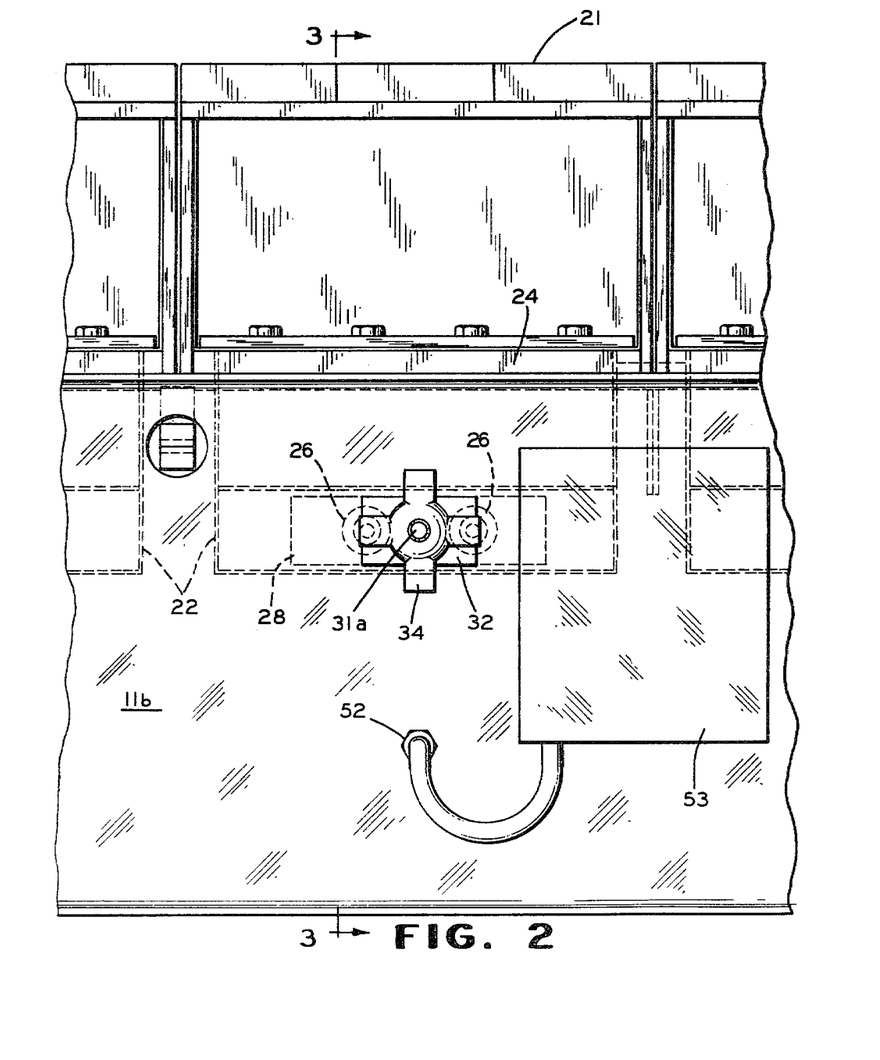
FIG. 2 is an enlarged scale schematic side elevational view of a portion of the tube alley of FIG. 1.
Figure 3:
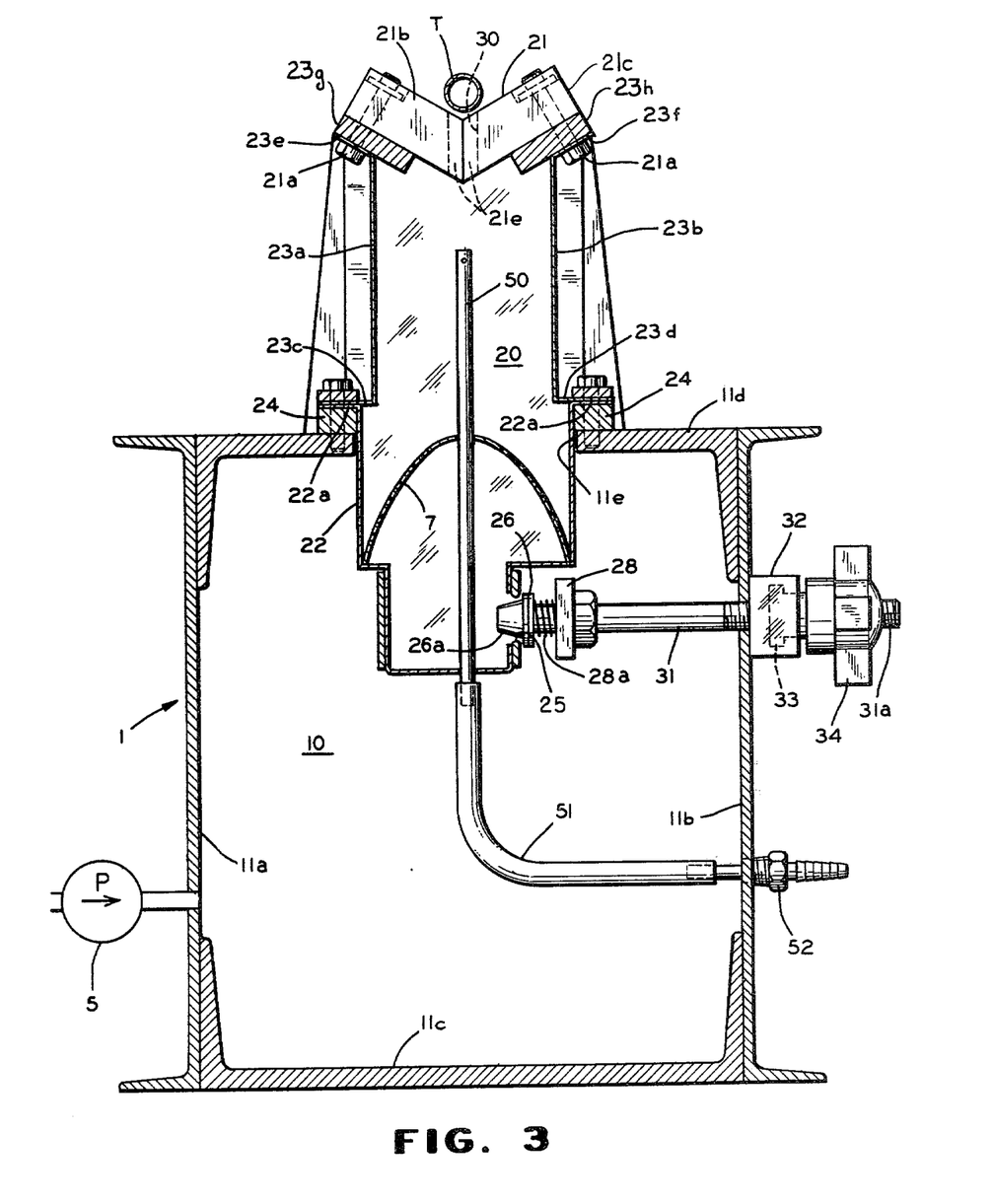
FIG. 3 is a vertical sectional view taken on the plane 3—3 of FIG. 2.
Figure 4:
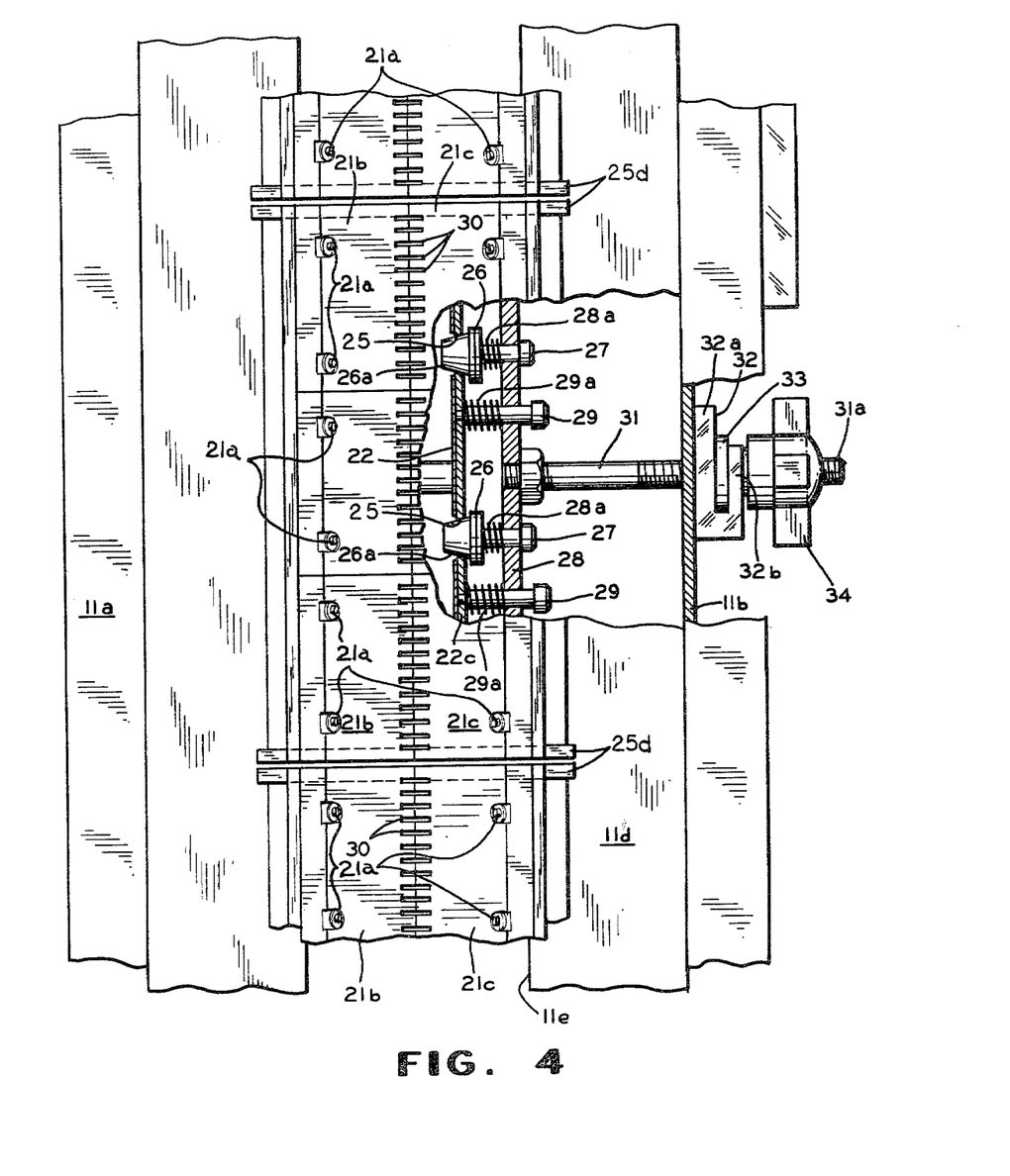
FIG. 4 is a partial top elevational view of FIG. 1 with parts broken away for clarity.

The foregoing adequately described one unit length of the air support portion of the tubing alley 1. Such unit is conveniently fabricated in a length of about ten inches. A plurality of identical units 20 are secured end to end to form the air support for the plastic tubing alley as shown in FIG. 1.

The number of chamber units 20 provided determines the degree of accuracy of control of the pressure of the support air. Similarly, the number of air admission apertures 25 has a significant bearing on the accuracy of maintenance of a desired pressure in each pressure controlled chamber 20. We preferably utilize a controlled air admission aperture 25 for every four to six inches of the tube alley 1.

To determine the proper correlation between the pressure in the pressure controlled chamber 20, and the number and size of air supply orifices 30 in relationship to the size and weight of the tubing T to be supported by air requires an exhaustive series of tests and calculations. It is, of course, possible to compute the static air pressure required to effect the elevation of a particular size and linear weight above the supporting V-shaped surface 21b. This would merely be any pressure which, applied to an area equal to that subtended by the engagement of the tubing walls with the V-shaped top surface 21, would provide a lifting force in excess of the weight per linear unit of the hot glass tubing T. Unfortunately, this simplistic approach does not provide the proper results in practice. As the tubing T is elevated out of contact with the top surface 21, the dynamic effects of the air flow must be taken into account. There is a definite pressure drop in the orifices 30. The effect of an air flow past the curved surface of the tubing is believed to induce angularly downward forces respectively perpendicular to the inclined surfaces of blocks 21b and 21c due to the planing effect of the air stream on the curved surface. This provides a self centering action. Because we are dealing with hot glass tubing at temperatures where the glass wall of the tubing is still plastic, any blast of air contacting the bottom of the tubing would tend to produce an inward deformation of the wall of the tubing. Lastly, the air flow volume should be as low as possible to minimize the cooling of the bottom of the tubing, resulting in bow. When you add to that the fact that every tubing alley must be capable of producing a relatively wide range of tubing diameters and weights, it becomes readily apparent that it is a matter of some difficulty to select a configuration and size of air supply nozzles 30 which will function with all tubing of a given size and weight range to continuously maintain the tubing in an elevated position relative to the top wall 21 of the air support system. Since dismantling of the tubing alley to replace the graphite blocks 21b and 21c to provide different sizes or configurations of air supply nozzles 30 is impractical, it necessarily follows that the control of air pressure existing in the pressure control chamber 20 is the only conveniently variable factor that is available to provide proper control of the apparatus for the required range of tubing size and weights.

For a range of tubing diameters from five to sixty-five millimeters, and an attendant range in tubing weight of 0.15 grams per centimeter to 78.0 grams per centimeter, we have determined that a slot width on the order of one-eighth inch and length of one-sixteenth inch, with a slot spacing of one-quarter inch, will provide highly efficient performance for all weights of tubing diameters from ten to twenty-five millimeters and acceptable performance for tubing diameters ranging from five to ten millimeters in diameter and from twenty-five to sixty-five millimeters in diameter. Of course, to adequately support the heavier sizes of tubing, a greater value of air pressure has to be maintained in the pressure control chamber 20, and lower pressures for the lighter sizes.

Figure 8:
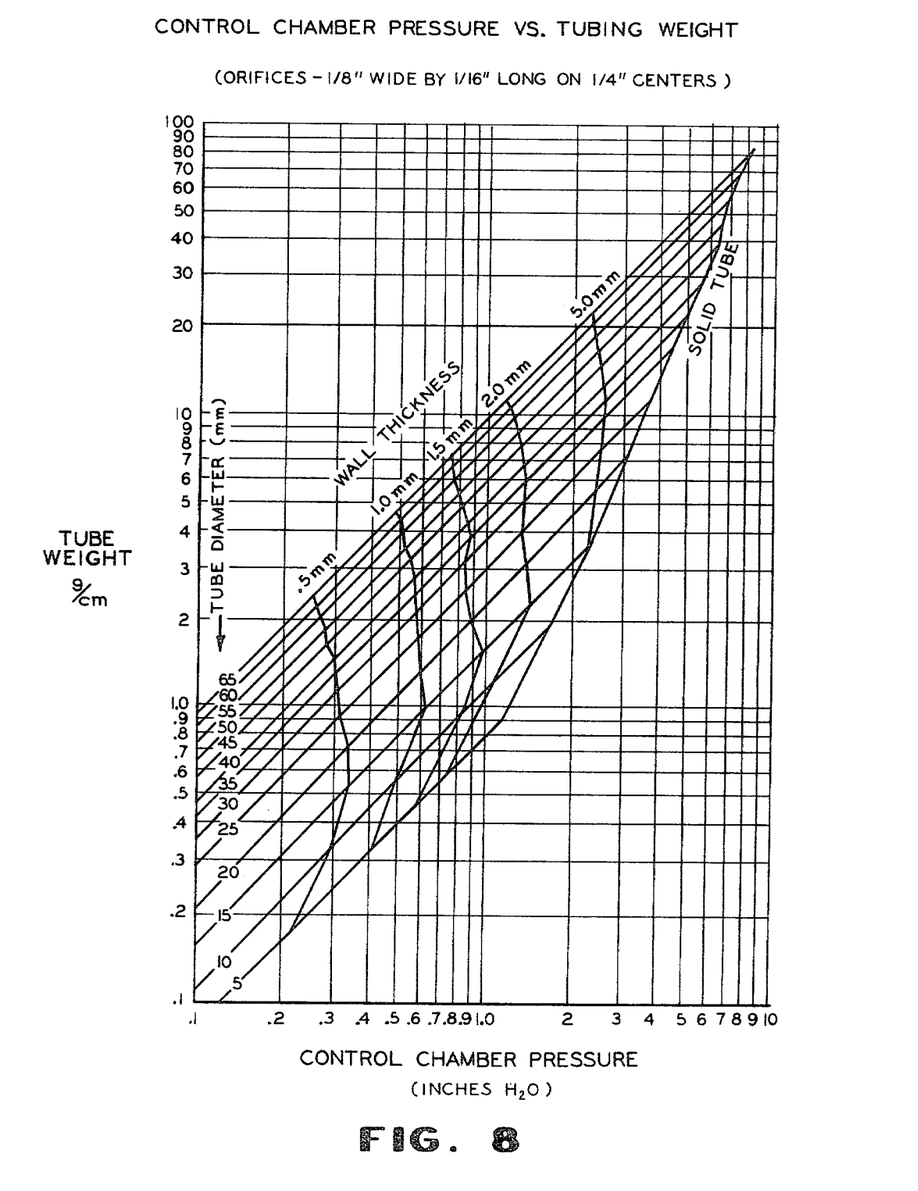
FIG. 8 is a chart showing the relationship between required air pressure and tubing diameter and linear weight.

In our experimentation, it became apparent that the tube weight, which of course is a function of the wall thickness of the tubing, was the more valid factor in determining the amount of static pressure required in the pressure control chamber 20 in order to adequately support any particular size and weight of tubing within the above mentioned range. Referring to FIG. 8, there is shown a graph indicating the required static pressure in inches of $H_2O$ versus tube weight in grams per centimeter. This graph constitutes a family of curves for a range of tube diameters from five to sixty-five millimeters and from this graph the proper static pressure head to be maintained in the pressure control chamber 20 can be conveniently determined.

Figure 9:
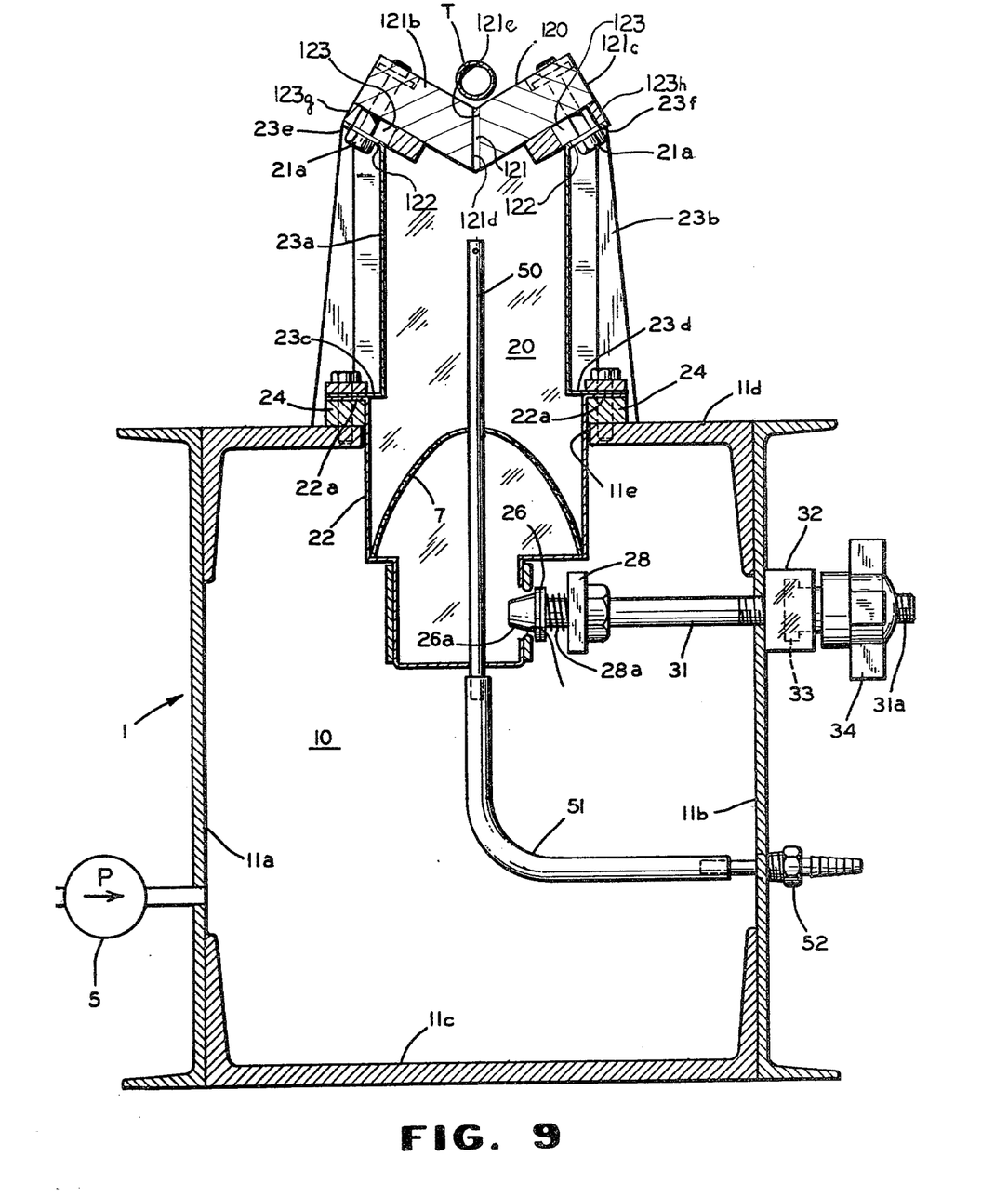
FIG. 9 is a view similar to FIG. 3 but showing a modified construction of the top wall of the tubing alley.
Figure 10:
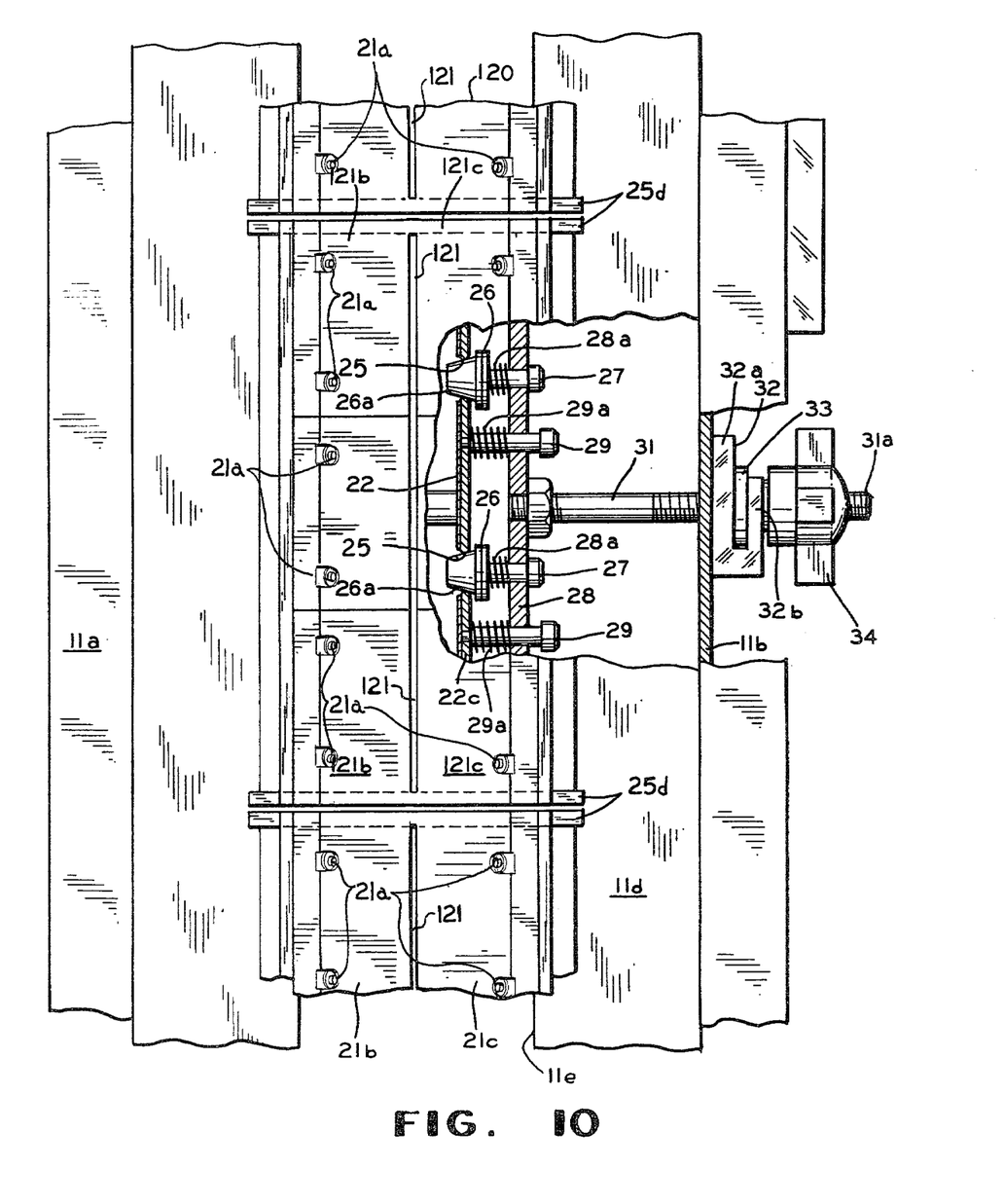
FIG. 10 is a partial top elevational view of FIG. 9.

Referring now to FIGS. 9 and 10, there is shown an alternate construction of the top wall of the air supporting unit which has the advantage of permitting more convenient adjustment of the upward air flow from pressure control chamber unit 20. Similar reference numerals in FIGS. 9 and 10 refer to the same components previously described in connection with the embodiment of FIGS. 1 through 8. The top wall 120 is now defined by a plurality of longitudinally abutting, laterally spaced block elements 121b and 121c. The support flanges 23e and 23f for such block elements are respectively provided with laterally elongated slots 122 which receive the bolts 21a which effect the securement of such wall elements to the supporting flanges 23e and 23f formed on the top of the chamber sidewall portions 23a and 23b. As in the modification of FIGS. 1 through 4, plates 123g and 123h may be respectively mounted between flanges 23e and 23f and the overlying blocks 121b and 121c. Such plates are provided with slots 123 to receive bolts 122. Laterally adjacent end faces 121d and 121e of the blocks 121b and 121c may thus be adjusted to provide any desired degree of separation or orifice 121 between such faces and this, of course, determines the effective flow area provided for the pressured air in chamber 20 to flow upwardly to provide support for the hot glass tubing T. With this modification, it is no longer necessary to replace the graphite blocks 21b and 21c of the modification of FIGS. 1 through 4 in order to change the effective amount of air flowing upwardly through the top wall 21 to provide support to the hot glass tubing T.

Another limiting factor in the volume of the flow of the supporting air, which is particularly important in the case of small diameter tubings, is the cooling effect of such air flow upon the bottom surface portions of the supported tubing. This effect may produce a condition known in the art as "bow" caused by the bottom portion of the tubing being cooled more rapidly than the top portion, resulting in the creation of stress in the tubing on final cooling causing it to bow upwardly. It is therefore desirable that either the dynamic air flow for smaller size tubing be maintained at a minimum to minimize the creation of "bow" or that supplemental cooling means be provided to concurrently cool the top portions of the tubing and thus avoid the creation of any stress due to unequal cooling of the top and bottom portions.

One approach to achieve cooling of the upper portions of the hot glass tube supported on the air support apparatus embodying this invention would be to direct a flow of cooling air on the top portions of the hot glass tube. Thus, referring to FIG. 5, an elongated sheet metal air manifold 35 could be provided which is connected to a suitable source of pressured air and has a longitudinally extending discharge passage defined by tapering sheet metal elements 35a extending along the top portions of the hot glass tubing T which is supported by the air support apparatus heretofore described. We have discovered, however, that this cooling system will not be effective to significantly reduce the amount of bow created in the hot glass tubing by the air support system unless it is located at a particular position along the tubing alley. It is well known in the art that tubing drawn through the length of an alley undergoes a helical movement, with the result that locus of the hottest area on the glass tube periphery moves in a helical path. This area is generally that opposite the area initially contacted by the air support. It is, therefore, necessary that the air manifold 35 be preferably positioned so that the longitudinal center of the air manifold will be approximately located at the position shown in FIG. 5 where the locus of the hottest area on the tube passes over the top portions of the air supported tube. Convection cooling applied in this manner significantly reduces the occurrence of bow in the air supported hot glass tube.

Figures 5, 6, 7:
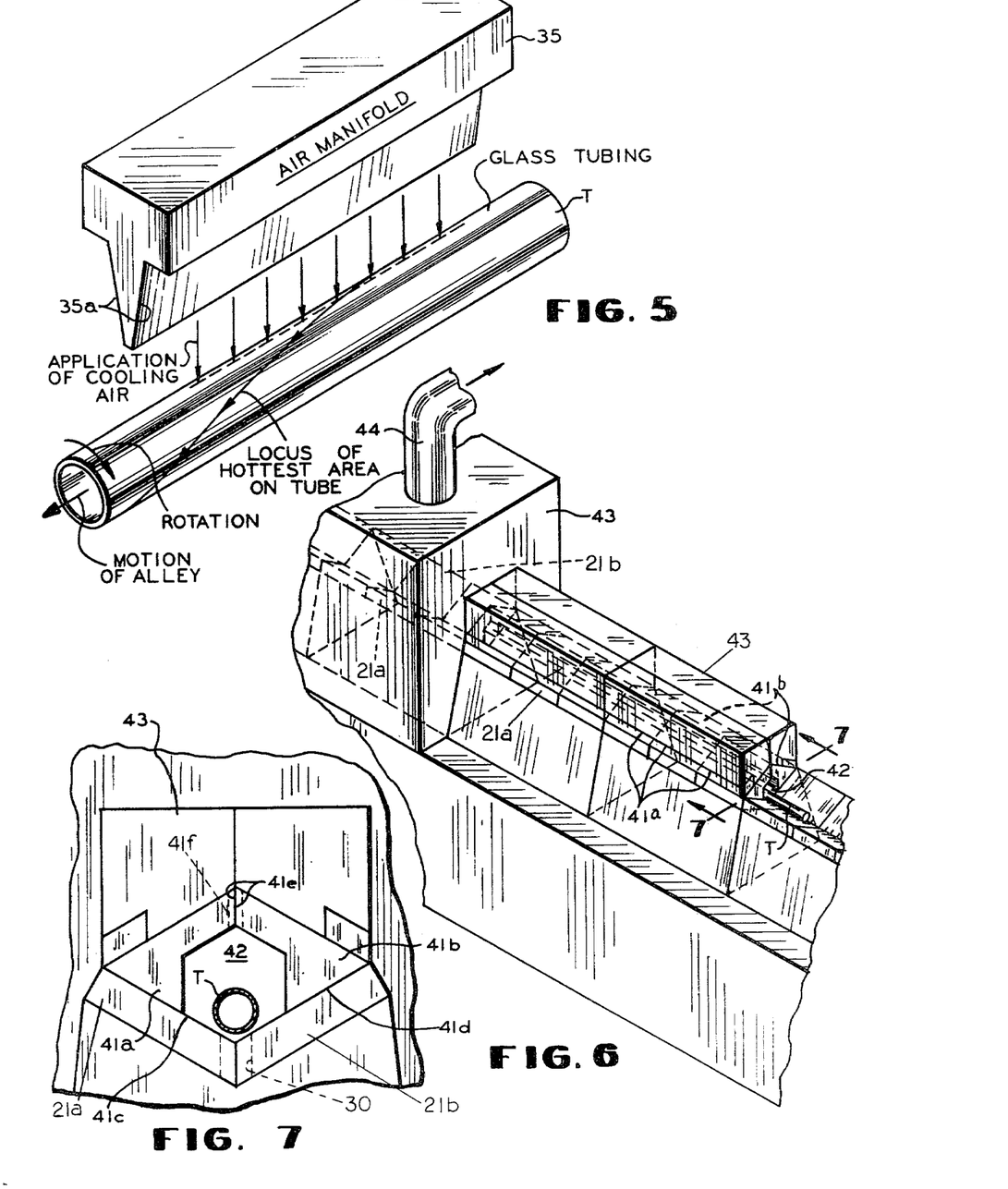
FIG. 5 is a schematic perspective view of one form of cooling apparatus designed to counteract the creation of bow in the air supported tubing.
FIG. 6 is a schematic perspective view of a modified form of cooling apparatus.
FIG. 7 is a partial vertical sectional view of FIG. 6.

An alternative apparatus for effecting the controlled cooling of the top portions of the tube is illustrated in FIGS. 6 and 7. Those portions of the hot glass tube T which are horizontally disposed on the air supporting apparatus are enclosed within a tunnel 42 defined by the imposition of appropriately shaped graphite blocks 41a and 41b on the inclined top surfaces 21b of the graphite air support blocks 21c and 21d. As best shown in FIG. 7, the blocks are preferably fabricated as identical sections 41a and 41b which have their bottom surfaces 41c and 41d inclined to match the inclination of the top surfaces of the air support blocks 21a and 21b and rest thereon. Each block 41a and 41b extends upwardly and inwardly to define a vertical wall surface 41e which is in abutting relationship with the laterally adjacent block. Each block 41a and 41b is of a convenient length, say ten inches, and the sections are longitudinally aligned to provide the desired total length. Block sections 41a and 41b thus cooperate to define a generally hexagonal cross section tunnel 42 which is extended along the length of the tubing alley from the hot end to a point where the tubing is sufficiently cooled in a compensating fashion to minimize the possibility of the creation of bow. The cold end portion of the tunnel 42 is connected to a vacuum plenum 43 which in turn is connected to the inlet side of an appropriate pump (not shown) by a pipe 44.

By virtue of this vacuum connection, a stream of cooling air is pulled through the length of the tunnel 42, entering at the hot end of the tunnel and exiting at the cold end of the tunnel through the vacuum plenum 43. Obviously, the absolute pressure within the top portions of the tunnel 42 will be reduced somewhat below ambient and this provides a synergistic effect insofar as the air support apparatus is concerned, because it permits an upwardly directed pressure differential to be created between the bottom and top sides of the hot glass tubing T tending to support the tubing and hence reducing the pressure of the support air required to be supplied beneath the tubing T through the nozzles 30. The described apparatus has been found to significantly reduce the occurrence of bow in hot glass tubing air supported by the apparatus embodying this invention, while at the same time reducing the pressure of the support air.

More effective cooling can be accomplished by the provision of a plurality of longitudinally spaced slots 41f in the abutting faces 41e of blocks 41a and 41b. When such slots are provided, it is desirable to provide a hood 43 over the tunnel blocks.

Modifications of this invention will of course be readily apparent to those skilled in the art and it is intended that the scope of the invention be determined solely by the appended claims.

We claim:

1. Apparatus for supporting hot glass tubing drawn from a soure of molten glass on a cushion of air comprising:
   (1) means defining a horizontally elongated chamber disposed beneath the drawpath of the tubing;
   (2) means for maintaining a selected elevated air pressure in said chamber;
   (3) said chamber having a top wall defining a V notch in vertical cross-section within which the tubing is disposed; and
   (4) a plurality of longitudinally spaced orifices in said top wall, traversing said vertex portion and permitting upward flow of air from said chamber, the lateral width and the length of said orifices, and the air pressure being selected as a function of the diameter and weight range of the glass tubing to be air supported.

2. Apparatus defined in claim 1 wherein the vertex portion of said top wall is formed of graphite.

3. Apparatus defined in claim 1 wherein said top wall is defined by laterally abutting identical graphite blocks, the abutting surfaces having vertical grooves therein defining said orifices.

4. Apparatus defined in claims 1, 2, or 3 wherein the subtended angle of said V notch is on the order of 100°.

5. Apparatus defined in claim 1 wherein said air pressure maintaining means comprises a horizontally extending housing defining a second air chamber extending parallel and adjacent to the first mentioned chamber, pumping means for elevating the air pressure in said second chamber, a plurality of longitudinally spaced apertures interconnecting said chambers, and means for adjusting the effective flow area of each aperture.

6. Apparatus defined in claims 1, 2, or 3 wherein said chamber comprises a longitudinal assembly of identical chamber units.

7. The apparatus defined in claim 1 plus means overlying said top wall for directing a flow of cooling air on the top portions of the air supported hot glass tubing to minimize the creation of bow in the tubing.

8. The apparatus of claim 7 wherein said air directing means comprises an elongated plenum chamber having an elongated discharge opening extending along the top portions of the air supported tubing, and means for supplying pressured air to said plenum chamber.

9. The apparatus defined in claim 3 plus means overlying said top wall for directing a flow of cooling air on the top portions of the air supported hot glass tubing to minimize the creation of bow in the tubing.

10. The apparatus of claim 7 wherein said air directing means comprises an elongated cover resting on said top surface and defining a tunnel through which the hot glass tubing moves, and means connecting the cold end of the tunnel to a vacuum source, thereby producing a flow of cooling air along the top portions of the hot glass tubing from the hot end of the tunnel to the cold end.

11. The apparatus of claim 8 wherein the longitudinal center of said discharge opening is disposed above the region where the helical hot area locus passes over the top of the glass tubing.

12. The apparatus of claim 10 wherein said cover comprises a plurality of pairs of identical graphite blocks disposed in longitudinal alignment on said top surface, the blocks of each pair being in laterally abutting relationship.

13. The apparatus of claim 10 wherein a plurality of longitudinally spaced apertures are provided in said cover to introduce cooling air flow at a multiplicity of points along said tunnel.

14. The apparatus of claim 12 wherein the abutting surfaces of said graphite blocks are provided with a plurality of slots defining entry passages for cooling air flow into said tunnel.

15. Apparatus for supporting hot glass tubing drawn from a source of molten glass on a cushion of air comprising:
    (1) means defining a horizontally elongated chamber disposed beneath the drawpath of the tubing;
    (2) means for maintaining a selected elevated air pressure in said chamber;
    (3) said chamber having a top wall defining a V notch in vertical cross-section within which the tubing is disposed; and
    (4) longitudinally extending aperture means in the top wall permitting upward flow of air from said chamber, the flow area of said aperture means and the air pressure in said chamber being selected as a function of the diameter and weight range of the glass tubing to be air supported.

16. Apparatus defined in claim 15 wherein said aperture means comprises an elongated slot in said top wall.

17. Apparatus defined in claim 15 wherein said top wall is defined by laterally adjacent blocks, said aperture means comprising the lateral spacing of said blocks.

18. Apparatus defined in claim 17 plus means for adjusting the lateral spacing of said blocks.

19. Apparatus defined in claim 15, 16, 17 or 18 wherein said air pressure mantaining means comprises a horizontally extending housing defining a second air chamber extending parallel and adjacent to the first mentioned chamber, pumping means for elevating the air pressure in said second chamber, a plurality of longitudinally spaced apertures interconnecting said chambers, and means for adjusting the effective air flow through each aperture.

20. A process for drawing glass tubing of a variety of weights and diameters from a source of molten glass without significant deformation of the glass surface, comprising the steps of:
    (1) drawing the hot glass tubing from a source of molten glass in a substantially horizontal direction;
    (2) passing the hot deformable portion of the drawn glass tubing between the walls of an horizontally elongated V-shaped notch, and
    (3) supporting the glass tubing in the V-shaped notch without contact therewith by an upward flow of air supplied primarily from the bottom vertex portion of said V-shaped notch.

21. A process for drawing glass tubing of a variety of weights and diameters from a source of molten glass without significant deformation of the glass surface, comprising the steps of:
    (1) drawing the hot glass tubing from a source of molten glass in a substantially horizontal direction;
    (2) passing the hot deformable portion of the drawn glass tubing between the walls of an horizontally elongated V-shaped notch;
    (3) supporting the glass tubing in the notch without contact therewith by an upward flow of air supplied primarily from the bottom vertex portion of said V-shaped notch, and concurrently applying a cooling stream of air to the top portions of the air supported glass tubing to effect substantially equalized peripheral cooling of the air supported glass tubing until the glass tubing has been cooled to a non-deforming temperature.

22. The method of claim 20 or 21 plus the step of controlling the fluid pressure of the supplied air as a function of the weight and diameter of the drawn glass tubing.

* * * * *